United States Patent [19]

Mathes et al.

[11] 4,174,661
[45] Nov. 20, 1979

[54] AUTOMATIC ROUND BALE TWINE WRAPPING ASSEMBLY

[75] Inventors: Arnold Mathes, Pella; Norman D. Person, Knoxville; Stanley J. Vermeer, Pella, all of Iowa

[73] Assignee: Vermeer Manufacturing Company, Pella, Iowa

[21] Appl. No.: 943,530

[22] Filed: Sep. 18, 1978

[51] Int. Cl.² ............................................. B65B 13/02
[52] U.S. Cl. ......................................... 100/5; 100/13; 100/88
[58] Field of Search .................. 100/5, 13, 88; 56/341

[56] References Cited

U.S. PATENT DOCUMENTS 3,894,484   7/1975   Anstey ...................................... 100/5

Primary Examiner—Billy J. Wilhite
Attorney, Agent, or Firm—Rudolph L. Lowell; G. Brian Pingel

[57] ABSTRACT

An automatic bale wrapping assembly for a machine that forms round bales of windrowed crop material and includes a mobile main frame with a bale forming assembly operative to continue rotating a completed bale while a wrapping twine is wound thereon, and a pickup mechanism for supplying such material to the bale forming assembly. The bale wrapping assembly has an extendible and retractable elongated twine dispensing arm having a pair of sections longitudinally movable relative to each other from one of which extends a free end section of the wrapping twine. The dispensing arm is pivotally supported on the main frame for movement between an initial bale wrapping position and a final twine cutting position. A control arm and hydraulic cylinder coact with the dispensing arm for relatively moving the pair of dispensing arm sections during pivotal movement of the dispensing arm, so that it is retracted in the initial bale wrapping position and extended in the final twine cutting position whereby a greater length of the twine free end section is exposed in the retracted position than is exposed in the extended position.

7 Claims, 8 Drawing Figures

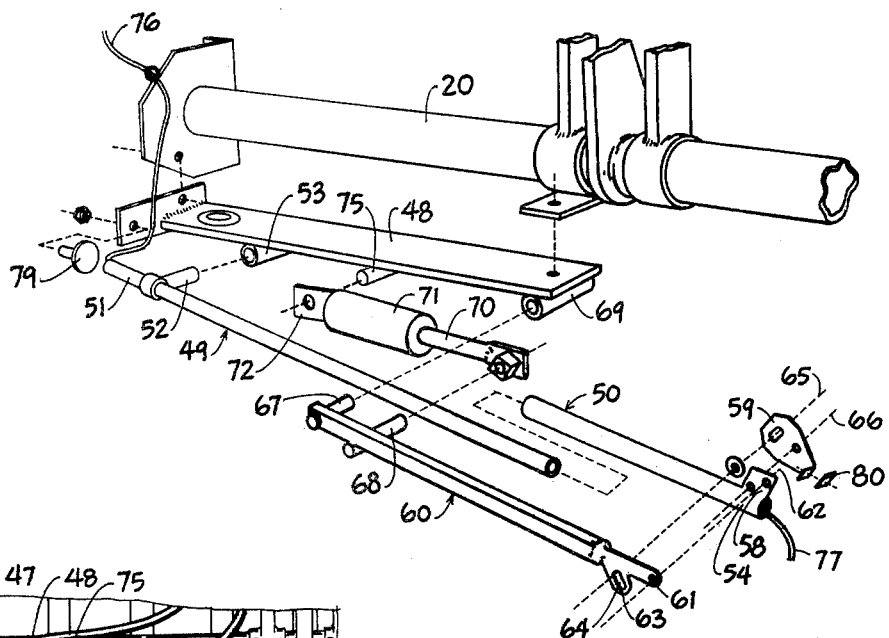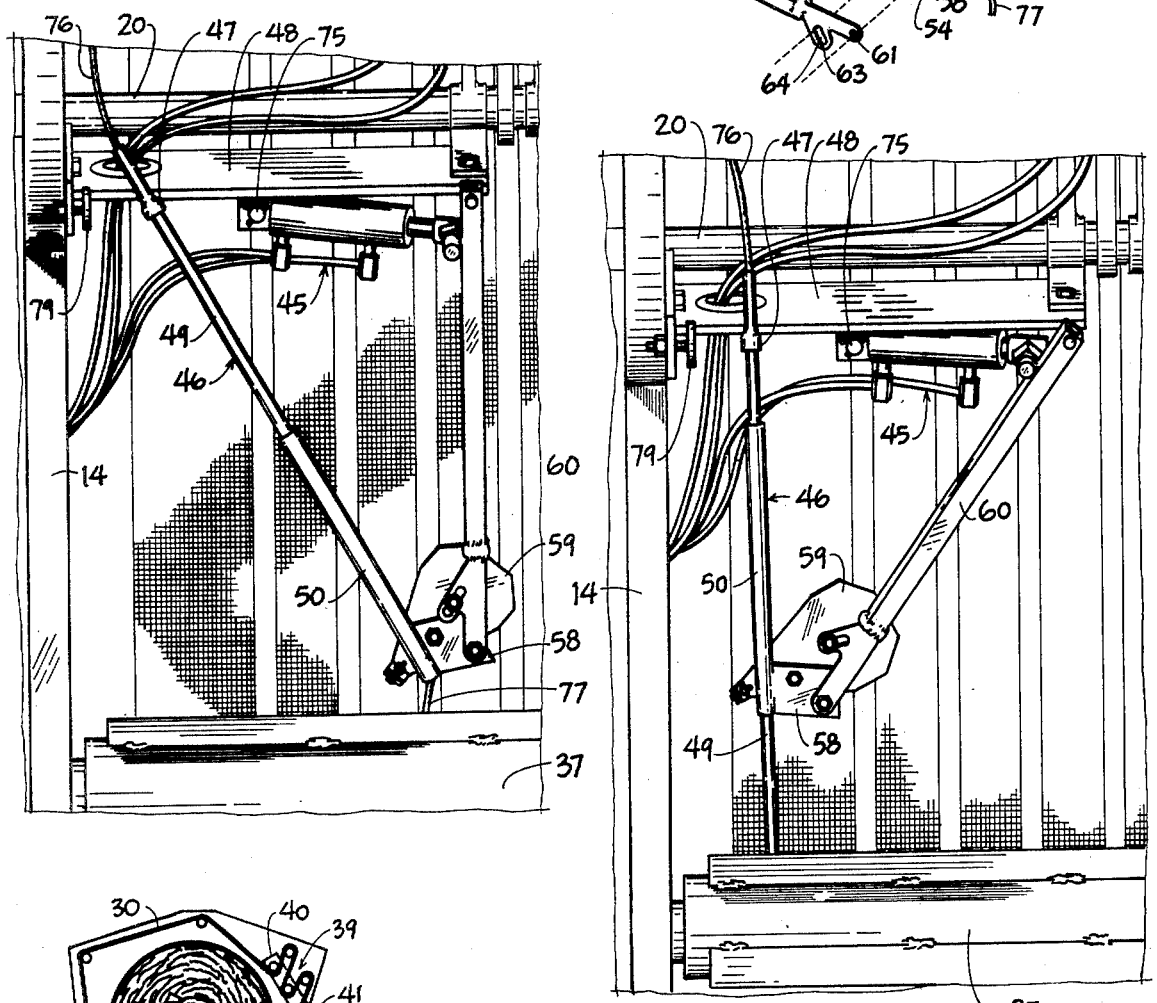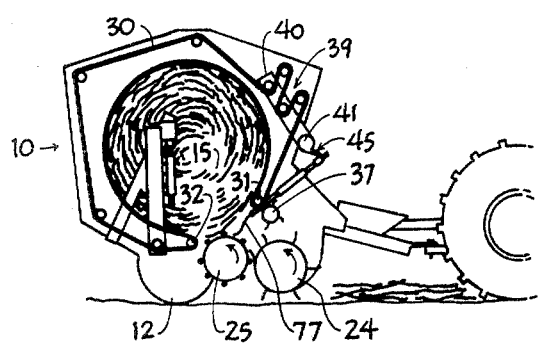

AUTOMATIC ROUND BALE TWINE WRAPPING ASSEMBLY

BACKGROUND OF THE INVENTION

1. Field of the Invention

The present invention relates in general to machines for forming round bales of windrowed material, and more specifically to such machines that have automatic bale wrapping assemblies for wrapping twine about the completed bales.

2. Description of the Prior Art

Machines for forming cylindrical bales of agriculture crop materials have been known for at least the last decade. However, the use of automatic bale wrapping assemblies with such machines is a recent development. An example of such an assembly is disclosed in two U.S. Pat. Nos. 3,894,484 and 3,913,473. The bale wrapping assembly disclosed in such patents includes a twine dispensing arm that is swung in a generally horizontal arc from one side of a formed bale to the other side by a hydraulic cylinder so that the twine is wrapped in a spiral about the bale as it is rotated.

Although the above assembly reduces certain of the bale wrapping steps required by prior manual bale wrapping assemblies, its operation is dependent upon the use of a one piece dispensing arm that is supported at only one end substantially intermediate the ends of a bale for horizontal swinging movement. Cutting of the twine at the end of a twine wrapping operation is accomplished by a relatively complicated mechanism to provide for extension from the arm, when wrapping is initiated, of a length of twine sufficient to reach between a pair of material pressing rollers located forwardly of the baling zone. Appreciable space to accommodate the swinging arm and twine cutting mechanism is thus required. The present invention sharply differs in structure from that of the above described assembly and employs a telescoping dispensing arm that is supported at both ends at all times during a bale wrapping operation and is positive in action to feed an adequate length of twine line directly into the baling zone.

SUMMARY OF THE INVENTION

The present invention provides a round bale forming machine having a mobile frame, a bale forming means on the frame operative to continue rotating a completed bale while a wrapping twine is wound thereon, and an improved assembly for automatically wrapping said twine about a bale formed by the machine. The wrapping assembly is of a simple and compact construction and efficient in operation. The linearly extendible and retractable elongated wrapping line dispensing arm has a pair of sections longitudinally movable relative to each other, with the wrapping twine having a free end portion extendible from one of said sections. The arm sections are relatively moved during pivotal movement of said dispensing arm so that the arm is retracted in the initial bale wrapping position and extended in the final twine cutting position whereby a greater length of the twine free end portion is exposed in the retracted position than is exposed in the extended position. Retraction of the arm thus automatically extends the twine free end portion from the arm.

In a preferred embodiment, the dispensing arm is formed of an inner base section and an outer section that are telescopically associated with one another. A control arm and a hydraulic cylinder serve as coacting means for producing relative longitudinal movement of the inner and outer sections. The control arm is pivotally interconnected at one end to the frame and at the other end to the outer section of the dispensing arm for pivotal movement concurrently with the pivotal movement of the dispensing arm to move the outer section with respect to said inner section. The hydraulic cylinder for actuating the control arm is connected to such arm and to the baler frame.

BRIEF DESCRIPTION OF THE DRAWINGS

FIG. 4 is an exploded perspective view of the bale wrapping assembly of FIG. 3;

FIG. 6 is an enlarged fragmentary front view similar to FIG. 3 showing the twine dispensing arm of the bale wrapping assembly in an initial bale wrapping position;

FIG. 7 is illustrated similar to FIG. 3 and shows the twine dispensing arm of bale wrapping assembly in a position intermediate the initial bale wrapping and the final twine cutting positions; and FIG. 8 is a diagrammatic side view similar to FIG. 2, showing a completed bale.

DESCRIPTION OF THE PREFERRED EMBODIMENT

Figure 1:
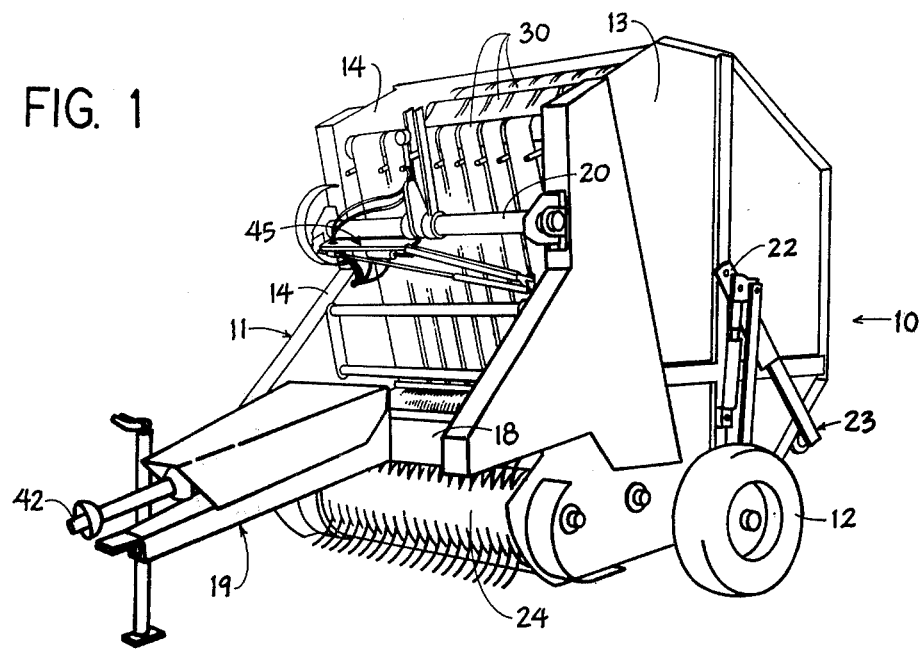
FIG. 1 is a front perspective view of a baling machine on which embodies the bale wrapping assembly of the present invention.

A preferred embodiment of the bale wrapping assembly of the present invention is incorporated in a bale forming machine indicated generally at 10 in FIG. 1 for forming large cylindrical bales of hay or other fibrous crop materials. The machine 10 is similar to the baling machine shown and described in U.S. patent application Ser. No. 763,589, filed Jan. 28, 1977, and incorporated herein by reference.

The machine 10 includes a main frame 11 mounted on a pair of ground wheels 12. The main frame 11 has a pair of upright spaced apart sidewalls 13 and 14 having a baling chamber 15 therebetween. A transverse lower beam 18 interconnects the lower forward ends of the sidewalls 13 and 14 and a tongue structure 19 extends forwardly from the transverse beam 18 for connection of the baler to a usual farm tractor (FIG. 2) having a conventional rear power take-off mechanism. The main frame 11 also includes an upper cross bar 20 interconnecting the upper front portions of the sidewalls 13 and 14 for a purpose to be described later. Pivotably supported from the main frame 11 at 22 is a rear gate assembly indicated generally by the numeral 23.

A pickup mechanism 24 of conventional construction is mounted for vertical adjustment on the main frame 11. The mechanism 24 spans the width of the frame 11 forwardly of the baling chamber 15 to elevate the crop material from the field as the machine 10 advances and delivers such material rearwardly onto a bale supporting roller 25 (FIG. 2) that forms part of a bale forming means. The bale supporting roller 25 also spans the width of the frame 11 between the sidewalls 13 and 14, and is driven in a counterclockwise direction, as viewed in FIG. 2, as is also the pickup mechanism 24.

Disposed between the opposite sidewalls 13 and 14 for upright and longitudinal movement are a series of transversely spaced flat belts 30 trained about belt supporting rollers including a bottom front roller 31 and lower rear roller 32.

Figure 2:
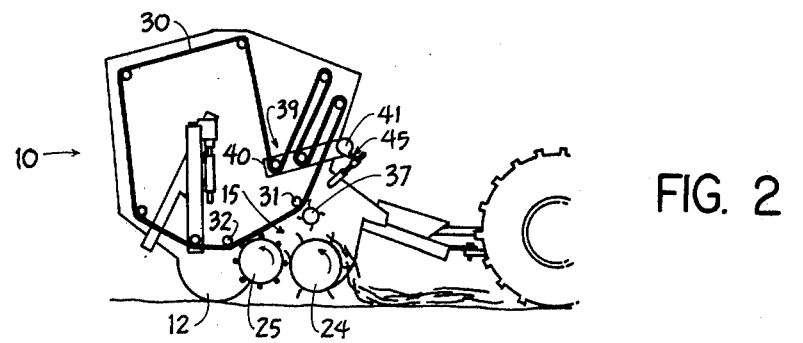
FIG. 2 is a diagrammatic side view of the baling machine of FIG. 1 in assembly relation with a tractor showing the initiation of a bale forming operation.

At the initiation of a bale forming operation, windrowed crop material is engaged and lifted by the rotating pickup mechanism 24 and moved rearwardly in a generally mat form to the upper peripheral surface of the bale supporting roller 25. The material on the upper peripheral surface of the roller 25 is then moved into engagement with the forwardly and upwardly moving lower runs of the belts 30, located between the rollers 31 and 32 and rolled in a clockwise direction as seen in FIG. 2. Initial forming or starting of a bale is assured by a bale starter roller 37 extended transversely of the frame 11 at a position below and spaced forwardly from the front roller 31. The starter roller 37 functions to sweep any material on the undersides of the lower belt portions downwardly toward the bale supporting roller 25 and into the baling zone or chamber 15 defined by the supporting roller 25, the lower runs of the belts 30, and the starter roller 37.

As the bale increases in size, the lower run portions of the belts 30 are extended by the provision of a tension or takeup mechanism, indicated generally at 39 and operable to maintain the belts under pressure and to permit extension of the belts about the upper peripheral portion of the bale. For a detail description of the tension mechanism 39, reference is made to U.S. Pat. No. 3,722,197. The mechanism 39 includes arms 40 adjacent each sidewall 13 and 14 and extended rearwardly and downwardly from pivot connections 41 with the cross bar 20. As the bale grows, the arms 40 swing clockwise to permit the portion of the belts 30 in the baling chamber 15 to expand until the bale is fully formed.

A bale wrapping assembly 45 is mounted on the main frame 11 generally above the pickup mechanism 24 for automatically feeding a length of twine from a twine supply (not shown) and into the baling chamber 15 as the formed and completed bale is continuously rotated to wrap the twine in a spiral configuration around the periphery of the bale.

Figure 3:
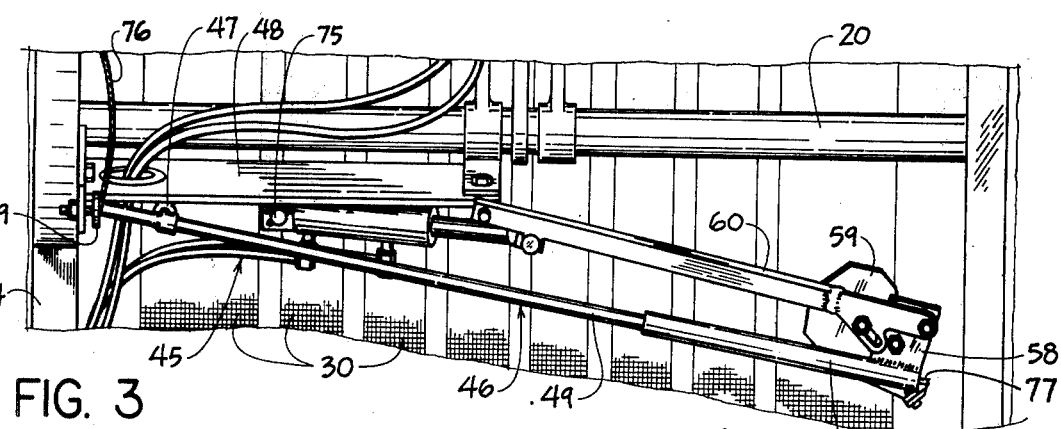
FIG. 3 is an enlarged fragmentary front view of the baler of FIG. 1 showing the bale wrapping assembly of the present invention with a twine dispensing arm thereof in a final twine cutting position.

Referring to FIGS. 3 and 4, the bale wrapping assembly 45 includes a linearly extendible elongated twine dispensing arm 46 pivotally connected at 47 to a mounting plate 48 at a position adjacent the sidewall 14. One end of the plate 48 is attached to the cross bar 20 and its opposite end to the frame sidewall 14. The dispensing arm 46 is formed of two tubular sections, one of which is an inner base section 49 and the other an outer section 50 that is slidably disposed on the section 49 in a telescoping relation thereto for relative longitudinal movement.

Figure 5:
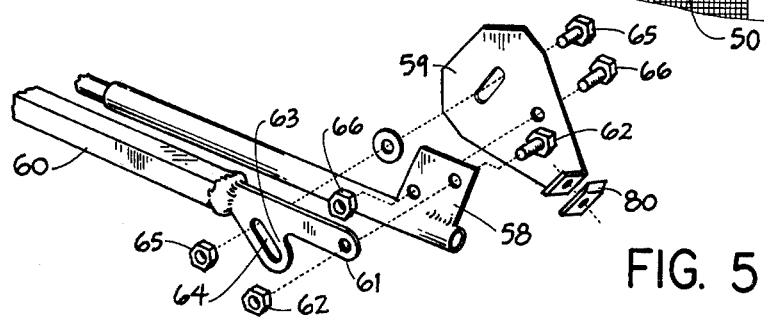
FIG. 5 is an enlarged fragmentary perspective view of an outer end of the bale wrapping assembly of FIG. 3.

As best indicated by FIG. 4, an inner end 51 of the dispensing arm inner section 49 has a laterally projected pivot pin or shaft 52 for reception in a sleeve bearing 53 carried on the underside of the mounting plate 48 to form the pivot connection 47. The outer end 54 of the dispensing arm outer section 50 has a laterally projected tab or ear 58 for interconnecting the section 50 to a twine cutter 59 and a control arm 60. The outer end of the control arm 60 is bifurcated and has a first bifurcation 61 (FIG. 5), pivotally connected to the tab 58 of the dispensing arm outer section 50 by a pivot assembly 62, and a second bifurcation 63. A slot 64 extended longitudinally of and formed in the bifurcation 63 receives a pivot assembly 65 to form a lost motion connection between the bifurcation 63 and the twine cutter 59. A pivot assembly 66 also forms a pivot connection for the dispenser arm tab 58 and the twine cutter 59.

Referring again to FIG. 4, the inner end of the control arm 60 has two axially spaced lateral pivot pins 67 and 68. The pin 67 is received in a second sleeve bearing 69 on the underside of the mounting plate 48 to pivotally support the control arm 60 on the mounting plate 48. The pin 68 forms part of a pivot connection between the control arm 60 and the outer end of a piston rod 70 of a hydraulic cylinder 71. The head end 72 of the cylinder 70 is pivotally connected at 75 to a medial portion of the mounting plate 48.

Extension or retraction of the piston rod 70 pivots the control arm 60 about the pivot 67 and the dispensing arm 46 about the pivot 52 through the pivotal interconnection of the control arm with the twine dispensing arm outer section 50. Concurrently with this pivotal movement, the outer section 50 is extended or retracted. Thus, the control arm 60 and the hydraulic cylinder assembly constitute coacting means for controlling the pivotal movement and extension and retraction of the dispensing arm 46.

Referring to FIG. 6, the rod 70 of the hydraulic cylinder 71 is shown fully retracted wherein the twine dispensing arm 46 is positioned adjacent to and substantially parallel with the sidewall 14 to define the initial bale wrapping position of the dispensing arm. In this position, the dispensing arm outer section 50 is fully retracted and the dispensing arm 46 extended downwardly from the mounting plate 48 between the rollers 31 and 37 and into the baling chamber 15 as shown in FIG. 8.

When the arm 46 is fully retracted in the initial bale wrapping position therefor, baling twine 76 (FIGS. 6 and 8) extended therethrough from a twine supply (not shown) has a free end portion 77 of a length to be gripped between the bale support roller 25 and the formed bale. On being gripped, the twine free end portion 77 is drawn under and then around the formed bale to form a first twine wrap about one end of the bale as the bale is rotated. After several wraps of the twine 76 about that end of the bale adjacent the frame side wall 14, the rod 70 of the hydraulic cylinder 71 is actuated by the baler operator toward its extended position to slowly pivot the control arm 60 and dispensing arm 46 counterclockwise or to the right as viewed in FIGS. 6 and 7.

As shown in FIG. 6, the outer end of the dispensing arm 46 is defined by the outer end of the inner section 49. As the control arm 60 and dispensing arm 46 are pivoted from their positions in FIG. 6 to their positions in FIG. 3, the dispensing arm outer section 50 is progressively moved outwardly relative to the inner section 49 (FIG. 7) so that in the twine cutting position of FIG. 3, the outer end of the dispensing arm 46 is defined by the terminal end of the outer section 50. It is seen, therefore, that the dispensing arm 46 moves within the baling zone 15 and longitudinally along the bale during the twine wrapping operation and is progressively extended in length as it moves toward the twine cutting position. Concurrently with such extension of the arm 46, the twine 76 is spiraled about the bale to form a tight wrapping therefor, with the number of wraps being determined by the rate of extension of the piston rod 70 and rotational speed of the bale.

During the twine wrapping operation, the travel of the twine 76 through the tubular dispensing arm 46, as it is drawn between the support roller 25 and the completed bale, is substantially unrestricted. However, as the dispensing arm 46 approaches its limit of movement to the right (FIG. 3) to the twine cutting position therefor, as defined by the full extension of the piston rod 70 from the cylinder 71, the inner end of the arm 46 contacts a washer or friction plate 79 supported from the mounting plate 48. As a result of such contact, the twine 76 is frictionally held between the plate 79 and the inner end of the arm 46 to prevent further free twine movement through the dispensing arm 46 whereby the twine 76 is drawn taut between the friction lock or plate and the support roller 25.

Referring to FIGS. 3, 6 and 7, it is seen that as the arm 46 is extended, the twine cutter 59 which is pivotally interconnected with the dispensing arm outer section 50 and the control arm 60, is pivoted in a counterclockwise direction as viewed in such figures, following an initial lost motion between the cutter 59 and the control arm 60. The pivotal movement of the twine cutter 59 positions a cutter blade 80 thereon for contact with the taut twine 76 adjacent to the terminal end of the outer section 50 as shown in FIG. 3. On cutting of the twine 76, the formed and wrapped bale may be ejected from the baler machine 10 by merely raising the end gate 23. Since the twine 76 is cut adjacent the end of the dispensing arm 46, the twine free end portion 77 is of a relatively short length (FIG. 3).

The dispensing arm 46 remains in the final or twine cutting position, which also constitutes the rest position of the arm and in this position the twine 76 is held in the arm 46 by the action of the friction plate 79. On completion of a next bale, the piston rod 70 of the hydraulic cylinder 71 is retracted to move the dispensing arm 46 from its rest or twine cutting position to the initial bale wrapping position therefor. Concurrently, with such movement, the dispensing arm 46 is retracted to expose the twine housed within the outer section 50 and automatically increase the length of the twine free end portion 77 for dropping on the supporting roller 25 to be drawn under the bale upon initiation of the bale wrapping operation.

The speed of movement of the dispensing arm 46 from the final twine cutting position to the initial bale wrapping position is not critical to the invention as no bale wrapping occurs during such movement. However, to decrease the cycle time of a bale wrapping operation, it is preferable that appropriate hydraulic control is employed to provide for a relatively fast speed dispensing arm 46 movement to the initial bale wrapping position, and a slower movement of the dispensing arm 46 from the initial bale wrapping position to the final twine cutting position. Of course, it should be realized that the use of the hydraulic cylinder 71 is not essential to the present invention for other means of moving the dispensing arm at an appropriate speed may be employed.

Although the invention has been described with respect to a preferred embodiment thereof, it is to be understood that it is not to be so limited since changes and modifications can be made therein which are within the full intended scope of this invention as defined by the appended claims.

We claim:

1. In a machine for forming a round bale of a windrowed material having a mobile frame, a supply of wrapping twine having a free end portion, bale forming means on said frame operative to continue rotating a completed bale while said wrapping twine is wound thereon, and a pickup mechanism for supplying said material to said bale forming means, the improvement of an automatic bale wrapping assembly comprising:
    (a) means for selectively initiating the winding of the wrapping twine about a completed bale,
    (b) a linearly extendible and retractable elongated wrapping twine dispensing arm having a pair of sections longitudinally movable relative to each other, with said wrapping twine free end portion extendible from one of said sections,
    (c) means on said frame movably supporting said dispensing arm on said frame for pivotal movement between an initial bale wrapping position and a final twine cutting position, and
    (d) coacting means interconnected with said frame and dispensing arm for relatively moving said pair of sections during pivotal movement of the dispensing arm so that the dispensing arm is in a retracted condition in said initial bale wrapping position and in an extended condition in said final twine cutting position whereby a greater length of said twine free end portion is exposed in the retracted condition than is exposed in said extended condition.

2. In a machine for forming a round bale according to claim 1 wherein:
    (a) the pair of sections of said dispensing arm comprise a tubular inner section by which said dispensing arm is movably supported from said frame; and
    (b) a tubular outer section telescopically mounted on said inner section whereby said free end portion of the twine is extendible from said inner section when said dispensing arm is in a retracted condition and from said outer section when said dispensing arm is in an extended condition.

3. In a machine for forming a round bale according to claim 2 wherein said coacting means includes:
    (a) a control arm having one end pivotally interconnected to said frame and to the outer section of said dispensing arm; and
    (b) power means for moving said dispensing arm to said initial bale wrapping position, wherein said free end portion of the wrapping twine is in a position to be drawn under and about one end of said formed bale as said bale is rotated.

4. In a machine for forming a round bale according to claim 1 including:
    (a) means movably interconnected with said control arm and outer section for cutting said twine when the dispensing arm is in the twine cutting position therefor.

5. In a machine for forming a round bale according to claim 4, wherein:
    (a) said cutting means includes a twine cutter pivotally movable from a noncutting position, wherein said dispensing arm is in said initial bale wrapping position to a twine cutting position, wherein said dispensing arm is in a final twine cutting position; and
    (b) means for releasably holding said wrapping twine taut when said dispensing arm is in said final twine cutting position.

6. In a machine forming a round bale according to claim 4 wherein:
 (a) the bale forming means includes a baling chamber, and
 (b) said dispensing arm in the initial bale wrapping position therefor, projects into said baling chamber adjacent one end thereof.

7. In a machine for forming a round bale of windrowed material having a mobile main frame, a supply of wrapping twine having a free end portion, bale forming means mounted on the frame, bale support means for feeding said material to said bale forming means and for rotating said material during and after completion of a bale, and a pickup mechanism for delivering said material to said bale support means, the improvement of an automatic bale wrapping assembly comprising:
 (a) a linearly extendible and retractable elongated wrapping twine dispensing arm having an inner section, an outer section telescopically associated with said inner section, and an outer end from which said free end portion of the wrapping twine is extended;
 (b) means on said frame for movably supporting said inner section of said dispensing arm for pivotal movement between an initial bale wrapping position and a final twine cutting position;
 (c) means connected to the outer section of said dispensing arm for said outer longitudinally moving section with respect to said inner section during pivotal movement of said dispensing arm to progressively vary the length of said arm so that said dispensing arm is in a retracted condition in said initial bale wrapping position, and in an extended condition in said final twine cutting position, whereby the outer end of said dispensing arm travels along the length of said formed bale; and
 (d) means for moving said dispensing arm to said initial bale wrapping position wherein said free end portion of the wrapping twine is positioned on said bale support means to be drawn under and about one end of said formed bale as said bale is rotated, and for subsequently moving said dispensing arm to said final twine cutting position to provide for the twine being wrapped about the bale over the length thereof.

* * * * *